(12) United States Patent
Deschaine

(10) Patent No.: US 6,570,844 B1
(45) Date of Patent: May 27, 2003

(54) SYSTEM AND METHOD FOR PROVIDING REDUNDANCY IN A TELECOMMUNICATIONS SYSTEM

(75) Inventor: Stephen A. Deschaine, Sunnyvale, TX (US)

(73) Assignee: Alcatel USA Sourcing, L.P., Plano, TX (US)

(*) Notice: Subject to any disclaimer, the term of this patent is extended or adjusted under 35 U.S.C. 154(b) by 0 days.

(21) Appl. No.: 09/221,944

(22) Filed: Dec. 28, 1998

Related U.S. Application Data

(60) Provisional application No. 60/068,902, filed on Dec. 29, 1997.

(51) Int. Cl.$^7$ .................................................. H04L 1/22
(52) U.S. Cl. ........................................ 370/217; 370/219
(58) Field of Search ................................ 379/243, 279; 370/219, 220, 227, 228, 216

(56) References Cited

U.S. PATENT DOCUMENTS

| | | | |
|---|---|---|---|
| 5,280,472 A | 1/1994 | Gilhousen et al. | 370/18 |
| 5,351,270 A | 9/1994 | Graham et al. | 375/1 |
| 5,375,140 A | 12/1994 | Bustamante et al. | 375/1 |
| 5,398,034 A | 3/1995 | Spilker et al. | 342/357 |
| 5,477,195 A | 12/1995 | Silker | 331/11 |
| 5,533,023 A | 7/1996 | Ohlson et al. | 370/69.1 |
| 5,548,583 A | 8/1996 | Bustamante | 370/18 |
| 5,566,164 A | 10/1996 | Ohlson | 370/18 |
| 5,570,349 A | 10/1996 | Bustamante et al. | 370/18 |
| 5,574,721 A | 11/1996 | Magill | 370/18 |
| 5,623,487 A | 4/1997 | Natali | 370/342 |
| 5,654,955 A | 8/1997 | Natali | 370/320 |
| 5,668,795 A | 9/1997 | Magill et al. | 370/209 |
| 5,687,166 A | 11/1997 | Natali et al. | 370/209 |
| 5,696,762 A | 12/1997 | Natali et al. | 370/320 |
| 5,717,713 A | 2/1998 | Natali | 375/200 |
| 5,729,570 A | 3/1998 | Magill | 375/206 |
| 5,734,639 A | 3/1998 | Bustamante et al. | 370/208 |
| 5,764,630 A | 6/1998 | Natali et al. | 370/320 |
| 5,933,474 A * | 8/1999 | Kipp | 379/1 |
| 6,111,852 A * | 8/2000 | Leung et al. | 370/217 |
| 6,148,415 A * | 11/2000 | Kobayashi et al. | 714/15 |

* cited by examiner

*Primary Examiner*—Ken Vanderpuye
(74) *Attorney, Agent, or Firm*—Baker & McKenzie; V. Lawrence Sewell; Craig A. Hoersten

(57) ABSTRACT

A redundancy system for a telecommunications system is provided. The redundancy system includes one or more resources, such as circuit cards containing circuits that process data for telecommunications channels. A controller bus is used to connect a controller to the resources. Another controller bus is also used to connect another controller to the resources. The resources are each coupled to the controller bus and the other controller bus, such that a change in control between the controller and the other controller may be accomplished by transferring data for the resources from the controller bus to the other controller bus.

2 Claims, 10 Drawing Sheets

SYSTEM AND METHOD FOR PROVIDING REDUNDANCY IN A TELECOMMUNICATIONS SYSTEM

CLAIM OF PRIORITY

The present application claims prior U.S. provisional patent application serial No. 60/068902 filed Dec. 29, 1997, entitled "SYSTEM AND METHOD FOR WIRELESS TELECOMMUNICATIONS", Stephen A. Deschaine, inventor.

RELATED PATENT APPLICATIONS

The present application is related to: (a) U.S. patent application Ser. No. 09/045,470, filed Mar. 20, 1998 entitled "METHOD AND SYSTEM FOR WIRELESS TELECOMMUNICATIONS", Robert J. McGuire, inventor; and (b) the U.S. Patent application entitled "SYSTEM AND METHOD FOR DYNAMICALLY ASSOCIATING TELECOMMUNICATIONS CHANNELS," Alcatel appln Ser. No. 09221934 filed Dec. 28, 1998 inventors Stephen A. Deschaine and Sharad V. Rao, both of which are expressly incorporated by reference for all purposes.

FIELD OF THE INVENTION

The present invention relates generally to telecommunications systems, and more particularly to a system and method for redundancy in a telecommunications system.

BACKGROUND

Telecommunications systems are used to provide telecommunications services between two or more user interfaces. User interfaces may include telephone handsets, facsimile machines, computers, and other equipment, and may be connected to the switching system by fixed land-based conductors or wireless services. Telecommunications services are provided by establishing a telecommunications channel between two user interfaces, such that encoded analog or digital data may be transmitted between the user interfaces until a state of completion is reached.

Telecommunications services are typically provided by either a wireline service system or a wireless service system. These systems must provide an acceptable level of reliability for users. Although many systems and methods are used to provide reliability, these systems and methods typically require installing twice as many telecommunications systems components than are necessary to provide service. These redundancy systems and methods result in a large amount of inactive or standby equipment.

SUMMARY OF THE INVENTION

Therefore, a need has arisen for a system and method for redundancy in a telecommunications system that reduces or eliminates the problems associated with providing redundancy in telecommunications systems.

In accordance with the present invention, a system and method for providing redundancy in a telecommunications system are provided that substantially eliminate or reduce disadvantages and problems associated with previously developed systems and methods for providing redundancy in telecommunications systems.

One aspect of the present invention is a redundancy system for a telecommunications system. The redundancy system includes one or more resources, such as circuit cards containing circuits that process data for telecommunications channels. A controller bus is used to connect a controller to the resources. Another controller bus is also used to connect another controller to the resources. The resources are each coupled to the controller bus and the other controller bus, such that a change in control between the controller and the other controller may be accomplished by transferring data for the resources from the controller bus to the other controller bus.

Yet another aspect of the present invention is a redundancy system for a telecommunications system that includes a spare bus. The redundancy system also includes one or more active resources, such as active circuit cards. Each active resource is connected to the spare bus. One or more spare resources are also coupled to the spare bus. Any of the active resources may be replaced by any one of the spare resources by using the spare bus to transfer data.

Yet another aspect of the present invention is a method for providing redundancy in a telecommunications system. The method includes receiving data that indicates that a resource has failed. A spare resource is activated, and the spare resource is then configured to match the configuration of the failed resource. A spare bus is used to transfer data to and from the spare resource.

The present invention provides many important technical advantages. One important technical advantage of the present invention is a system that provides redundancy without requiring all of the system resources to be duplicated. The redundancy system of the present invention allows high levels of system reliability to be achieved without requiring a large number of standby components.

Another important technical advantage of the present invention is a method for providing redundancy that allows failed components and resources to be quickly replaced without significantly impacting the performance of the system. The method of the present invention minimizes the number of components that must be swapped but in a system in the event of a component failure, thus providing high levels of reliability without a large number of duplicate components.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE DRAWINGS

Figure 1:
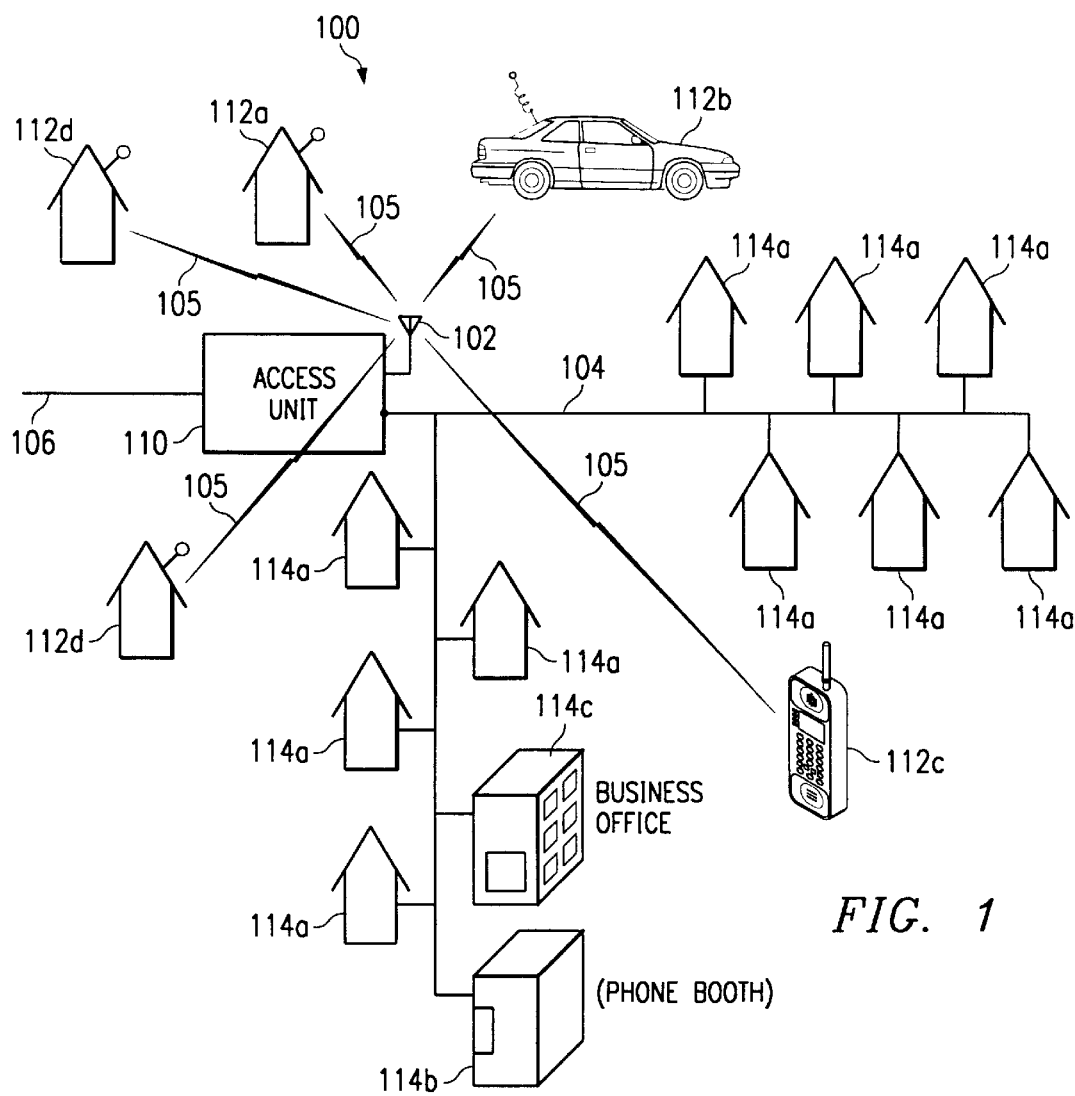
FIG. 1 is a diagram of an integrated wireless and wireline telecommunications system in accordance with an exemplary embodiment of the present invention.

FIG. 1 is a diagram of an integrated wireless and wireline telecommunications system 100 in accordance with an embodiment of the present invention. Telecommunications system 100 includes an access unit 110, which is operable to interface with wireless terminal devices using transceiver 102 and to communicate with wireline terminal devices using wireline telecommunications channels 104. Access unit 110 is also operable to communicate with a switched network via a switched network telecommunications channel 106. Switched network telecommunications channel 106 may comprise a wireline or wireless telecommunications media, such as one or more copper conductors, one or more coaxial conductors, a microwave link, one or more fiber optic conductors, or other suitable media.

Access unit 110 includes control functionality and switching functionality so as to enable a user of any terminal device to contact any other user of any other terminal device or a terminal device accessible via the switched network. Access unit 110 is scaleable, so as to allow any suitable combination of wireless and wireline terminal devices. Access unit 110 may include a time slot interchange switch, a wireless assembly, a wireline assembly, a controller, and other suitable devices.

Transceiver 102 is used to transfer telecommunications data between suitable wireless terminal devices. For example, wireless terminal devices accessed by transceiver 102 may include stationary wireless terminal devices 112a and 112d, mobile automotive wireless terminal devices 112b, and mobile handheld wireless terminal devices 112c. Access unit 110 is operable to switch a connection between two wireless terminal devices of telecommunications system 100. For example, a caller using wireless terminal device 112a may contact a caller using wireless terminal device 112b through access unit 110 without requiring switching through a central office switch, or may alternatively switch through the central office if suitable resources for switching the telecommunications channel are unavailable at access unit 110.

Access unit 110 also provides telecommunication services to wireline service users via wireline communications media 104. Wireline communications media 104 may comprise one or more copper conductors, one or more fiber optic conductors, or other suitable conductors carrying data in a suitable wireline data format, such as DS0, T1, E1, or other suitable formats. Wireless telecommunications media 105 may be a suitable radio frequency telecommunications channel, such as a high frequency code division multiple access media, high frequency time division multiple access media, or other suitable wireless communications media. Wireline communications media 104 couples wireline terminal devices to access unit 110. For example, wireline terminal devices in a residence 114a, a phone booth 114b, or business office 114c, may be coupled to access unit 110.

In operation, a caller using a wireless terminal device or a wireline terminal device places a call to another user of a wireless terminal device or wireline terminal device, or to the switched network through access unit 110. Access unit 110 is operable to connect any wireless terminal device or wireline terminal device serviced by access unit 110 to any other wireless terminal device or wireline terminal device serviced by access unit 110. Likewise, access unit 110 is operable to connect a call from the switched network to any wireline or wireless terminal device serviced by access unit 110, and to connect any wireless or wireline terminal device accessed by access unit 110 to the switched network. In this manner, access unit 110 provides switching services typically associated with the central office switch. In addition, access unit 110 is scaleable and may be installed in low density areas and upgraded as population density increases, with minimal cost. Likewise, access unit 110 may be installed in areas of transitional population density, such that subscribers in the immediate vicinity of access unit 110 may be serviced by wireline services, and remote subscribers may be serviced by wireless telecommunications services. Access unit 110 may also be used advantageously in urban areas that require a mix of wireline and wireless telecommunications systems services, but are not undergoing growth or population density changes.

Figure 2:
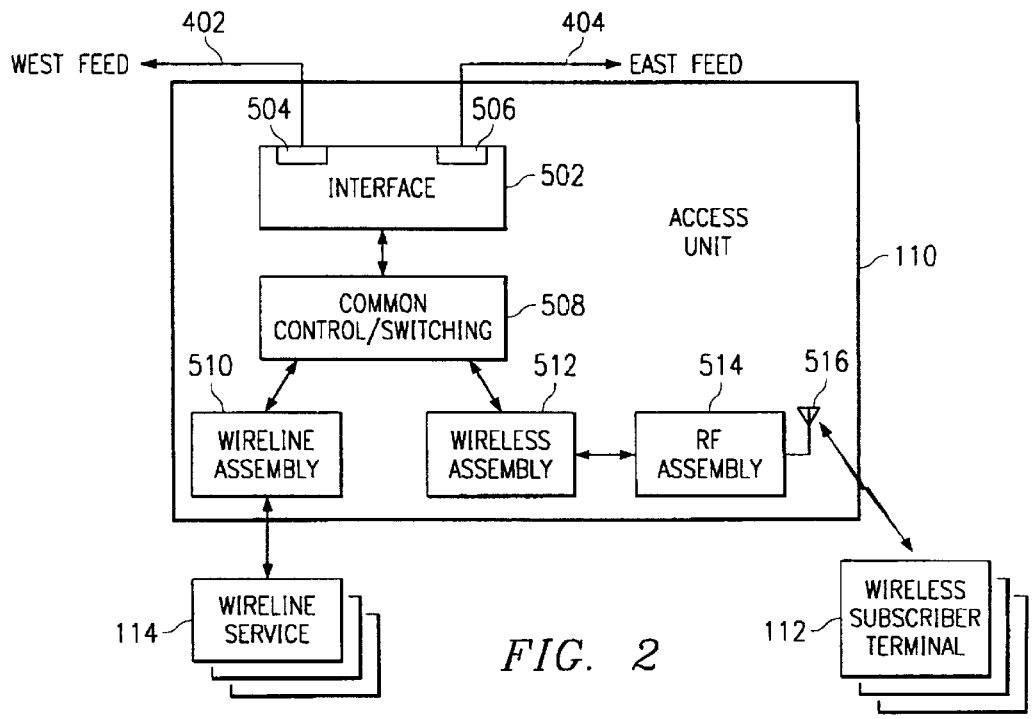
FIG. 2 is a block diagram of an access unit in accordance with an exemplary embodiment of the present invention.

FIG. 2 is a block diagram of an access unit 110 in accordance with an exemplary embodiment of the present invention. Access unit 110 includes interface system 502, which uses feeder interfaces 504 and 506 to interface with feeders, such as "west" feeder 402 and "east" feeder 404. Feeder interfaces 504 and 506 may be, for example, fiber optic interfaces when the feeders such as "west" feeder 402 and "east" feeder 404 are fiber optic media.

Interface system 502 is coupled to common control and switching system 508. Common control and switching system 508 is used to interface telecommunications channels, and is operable to receive signaling and control data and to route telecommunications channels between terminal devices in response to the signaling and control data. In addition, common control and switching system 508 is operable to maintain telecommunications channels after they have been formed and to break down the telecommunications channel after the call has been completed. Common control and switching system 508 may perform accounting, provisioning, maintenance, operations, and other telephony-related functions that are required to provide full telecommunications services to subscribers.

Wireline assembly 510 is coupled to common control and switching system 508, and provides wireline services to wireline telecommunications services subscribers such as wireline subscriber terminal 114. For example, wireline assembly 510 may comprise one or more line card assemblies that are coupled to a wireline subscriber terminal 114 through a copper conductor, a coaxial cable, a fiber optic conductor, or other suitable wireline telecommunications channels. Wireline assembly 510 may be used to provide suitable wireline services, for example T Carrier digitally multiplexed telecommunications, such as T1, T1C, T2, T3, T4, DS1, DS2, DS3, DS4, DS5; asynchronous transfer mode communications; video communications; or other suitable wireline telecommunications services for audio, video, and/or data.

Wireless assembly 512 is coupled to common control and switching system 508, and provides wireless services to wireless telecommunications services subscribers such as wireless subscriber terminal 112. For example, wireless assembly 510 may comprise one or more wireless service card assemblies that are coupled to a wireless subscriber terminal 112 through modulated radio frequency signals, such as code division multiple access signals, GSM signals, PCS signals, or other suitable signals. Wireless assembly 512 may be used to provide suitable audio, video and/or data analog or digital wireless services, for example, PCS services in accordance with IS136, IS95, PCS1900, PHS, DCS1800, or other suitable standards, and data services in accordance with CDPD, IS136, IS95, 802.11, PDC, RAM, PHS, DCS1800, or other suitable standards.

RF Assembly 514 is coupled to wireless assembly 512 and antenna 516, and is used to provide radio frequency transmission and reception of modulated signals for wireless assembly 512. RF assembly 514 modulates radio frequency signals in response to control signals from wireless assembly 512, such that telecommunications control, signaling and payload data may be transmitted to one or more wireless subscriber terminals 112.

In operation, telecommunications channels are established, maintained, and broken down by access unit 110. The telecommunications channels may be established by receiving control and signaling data from a switched network via interface system 502, or from wireline service subscribers via wireline assembly 510, or from wireless service subscribers via wireless assembly 512. Common control and switching system 508 may include functionality, such as call processing systems, that allows telecommunications channels to be established at access unit 110, such as a telecommunications channel between two wireless subscribers, two wireline subscribers, or between a wireline subscriber and a wireless subscriber. Also or alternatively, common control and switching system 508 may coordinate the establishment of telecommunications channels between a central office and the subscriber terminal, such that all call processing is performed by the central office. In this manner, a call from one wireless subscriber to another wireless subscriber would be routed through the switched network instead of through common control and switching system 508.

Figure 3:
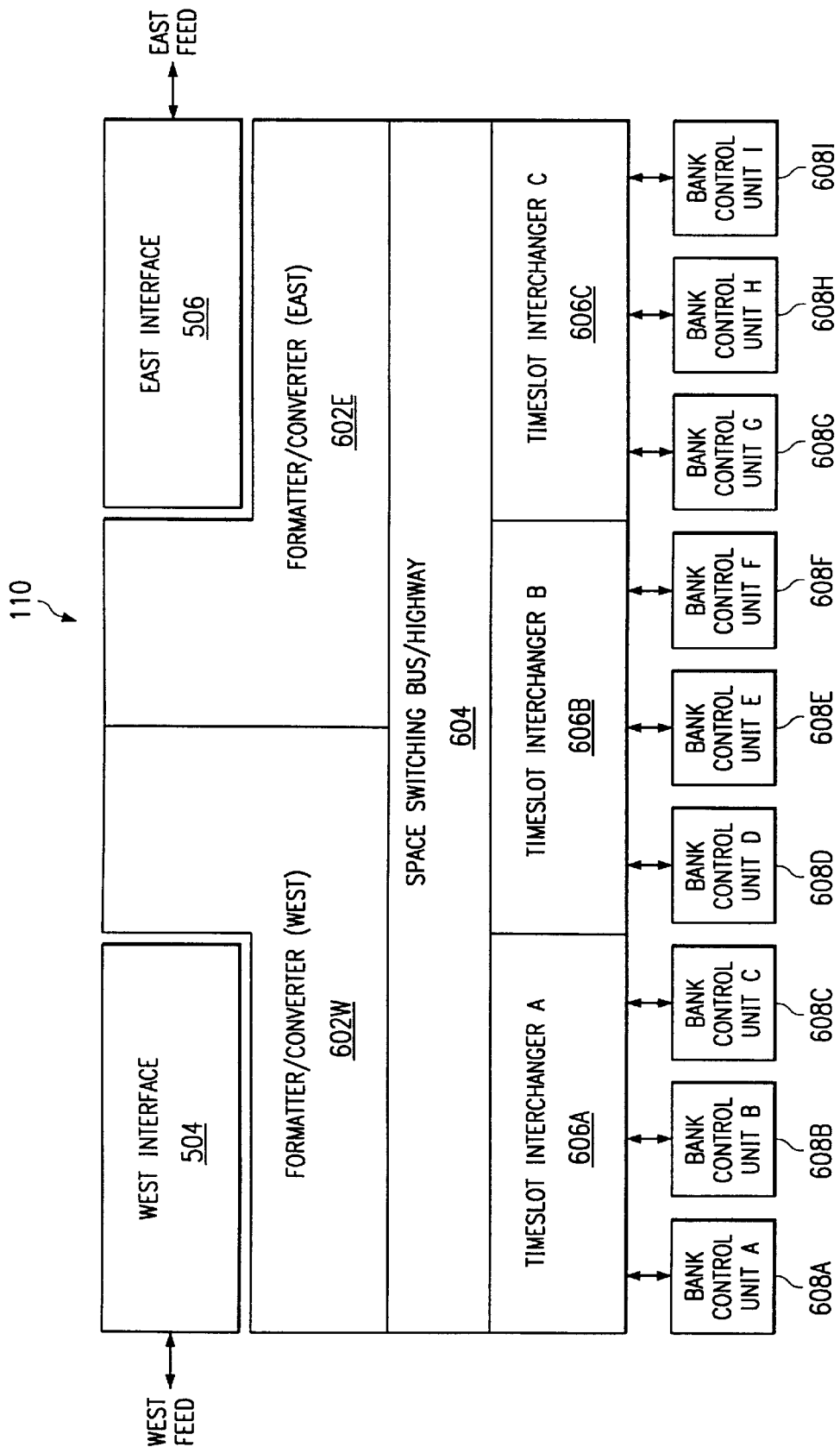
FIG. 3 is a block diagram of an access unit in accordance with an exemplary embodiment of the present invention.

FIG. 3 is a block diagram of an access unit 110 embodying concepts of the present invention. Access unit 110 of FIG. 3 includes west interface 504 coupled to west feed and east interface 506 coupled to east feed. West interface 504 and east interface 506 are operable to convert telecommunications data from a format used by west feed and east feed to a format suitable for processing by access unit 110.

West interface 504 is coupled to formatter/converter 602W, and east interface 506 is coupled to formatter/converter 602E. Formatter/converters 602W and 602E are used to convert data from the format carried by west feed and east feed into a format usable by access unit 110. For example, west feed and east feed may provide data to formatter/converter 602W and 602E that is in a first format, such as a synchronous optical network format. Formatter/converters 602W and 602E then convert the data into a format for processing by access unit 110, such as a proprietary data format.

Formatter/converters 602W and 602E are coupled to space switching bus/highway 604. Space switching bus/highway 604 is a data bus/conductor that is used to transfer data between formatter/converter 602W, formatter/converter 602E, and other components of access unit 110. Space switching bus/highway 604 may include one or more serial conductors acting alone or in parallel, or other suitable data buses.

Space switching bus/highway 604 is coupled to time slot interchangers 606A, 606B, and 606C. Time slot interchangers 606A through 606C are used to switch data from a first channel to a second channel. For example, space switching bus/highway 604 may include two or more data channels of data that are transferred to time slot interchangers 606A through 606C, which are operable to switch the data from a first channel to a second channel.

In addition, FIG. 3 includes bank control units 608A through 608I. Bank control units 608A through 608I are used to provide telecommunications channel control to wireless bank assemblies and wireline bank assemblies. For example, bank control units 608A, 608B, and 608C may be used to provide wireless telecommunications service, whereas bank control units 608D, 608E, and 608F may be used to provide wireline telecommunications services. Each bank control unit provides additional control to one or more line cards. Bank control units 608A through 608I may alternatively comprise a suitable combination of wireless bank assemblies and wireline bank assemblies.

Figure 4:
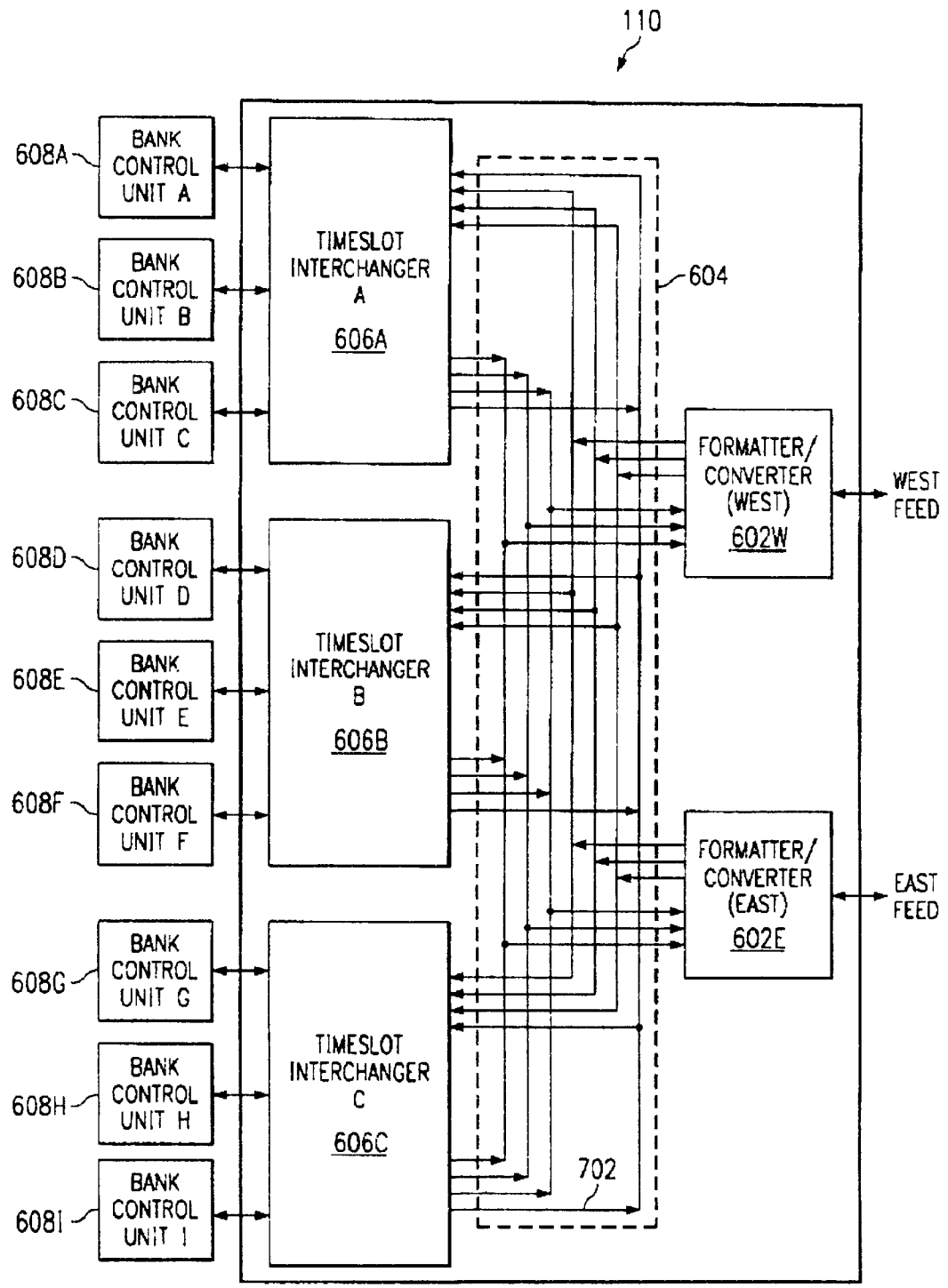
FIG. 4 is a block diagram of an access unit in accordance with an exemplary embodiment of the present invention.

FIG. 4 is a block diagram of an access unit 110 in accordance with an embodiment of the present invention. Access unit 110 includes time slot interchangers 606A through 606C, which are coupled to data bus 604. Formatter/converters 602W and 602E are coupled to bus 604. Bus 604 is used to transfer data between formatter/converters 602W and 602E, and time slot interchangers 606A through 606C. Time slot interchangers 606A through 606C then perform time slot switching of data received from formatter/converters 602W and 602E. For example, time slot interchanger 606A may receive data over bus 604 from formatter/converter 602W, and may read that data to a predetermined memory location and subsequently write the data to a different predetermined time slot on time slot bus 604. This time slot may be read by formatter/converter 602E, and subsequently transmitted to a location beyond access unit 110. Alternatively, formatter/converters 602W and 602E may be coupled to any of bank control units 608A through 608I through bus 604 and time slot interchangers 606A through 606C. This embodiment also allows payload data to be directly transferred between formatter/converters 602W and 602E via the space-switching highway of bus 604.

Figure 5:
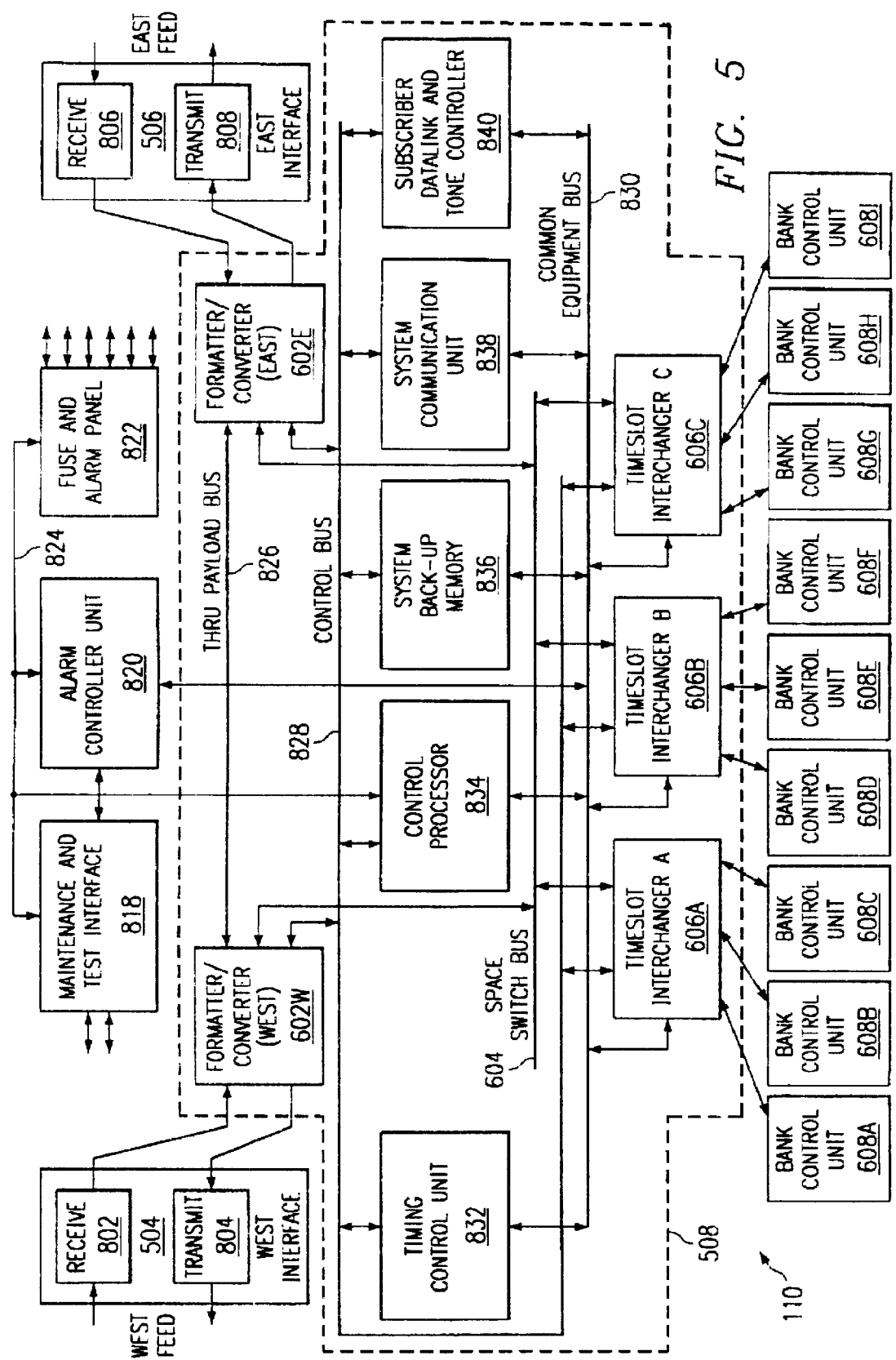
FIG. 5 is a block diagram of an access unit in accordance with an exemplary embodiment of the present invention.

FIG. 5 is a block diagram of an access unit 110 in accordance with an embodiment of the present invention. Access unit 110 of FIG. 5 includes features of access unit 110 shown in other drawings, plus additional features, systems, and functionality.

As shown in FIG. 5, formatter/converter 602W is coupled to through-payload bus 826, control bus 828, and space switch bus 604. Through-payload bus 826 is used to transfer telecommunications data that does not require switching between formatter/converter 602W and formatter/converter 602E. In this manner, access unit 110 may be coupled to other access units 110, thus allowing a series assembly of access units to be used to provide wireless and wireline telecommunications services and access to a switched network.

Access unit 110 of FIG. 5 also includes maintenance and test interface 818, alarm controller unit 820, and fuse and alarm panel 822, each of which are coupled together and to control processor 834. In addition, alarm controller unit 820 is coupled to common equipment bus 830. Maintenance and test interface 818 is used to provide a user interface to access unit 110 of FIG. 5 for test, maintenance, and other purposes. Alarm controller unit 820 monitors the status of components and systems of access unit 110, and generates alarms when predetermined conditions occur. Fuse and alarm panel 822 contains fuses and also provides external interfaces to alarm indicator systems and components.

Access unit 110 of FIG. 5 also includes timing control unit 832, which is coupled to control bus 828 and common equipment bus 830. Timing control unit 832 controls the timing on control bus 828 and common equipment bus 830 to maintain a high timing tolerance that is required to support the data transmission rate. Timing control unit 832 may include a high-accuracy clock and synchronization circuitry that is operable to receive an external clock signal and to synchronize with the external clock signal.

Control processor 834 is coupled to control bus 828 and common equipment bus 830. Control processor 834 receives signaling and control data from the switched network, wireline subscriber terminals, and wireless subscriber terminals, and generates call routing and setup signaling and command data in response to the received data. For example, control processor 834 may be used to coordinate the establishment of telecommunications payload channels to the switched network and wireless or wireline subscriber terminals, where such channels are established in parallel in order to increase the speed at which service is established. Control processor 834 may also coordinate with other systems and components, such as the wireless assembly 512 and wireline assembly 510 of FIG. 2.

System back-up memory 836 is coupled to control bus 828 and to common equipment bus 830. System back-up memory 836 stores system status information, operating code, look-up tables, and other telephony-related data and programming. System communication unit 838 is coupled to control bus 828 and common equipment bus 830, and is used to provide data communications between systems and components of access unit 110. Subscriber datalink and tone controller 840 is coupled to control bus 828 and to common equipment bus 830, and performs telephony-related functions such as tone generation and recognition.

Control bus 828 and common equipment bus 830 are used to transfer data between the components and systems of access unit 110. Control bus 828 carries control data that is used to coordinate the operation of equipment and systems of access unit 110, such as to coordinate the setting up, maintenance, and break-down of telecommunications channels. Common equipment bus 830 is used to provide access to commonly-used telephony equipment, for example, to allow telecommunications channels that are being carried through timeslot interchangers 606A through 606C to be processed by subscriber datalink and tone controller 840 in order to perform tone detection and generation.

In operation, access unit 110 of FIG. 5 is used to provide telecommunications switching and access functions for wireless and wireline subscriber terminals. The timing, control, inter-system communication, and other functions required in order to support telecommunications switching and access functions are provided by the exemplary systems and components shown and described in FIG. 5.

Figure 6:
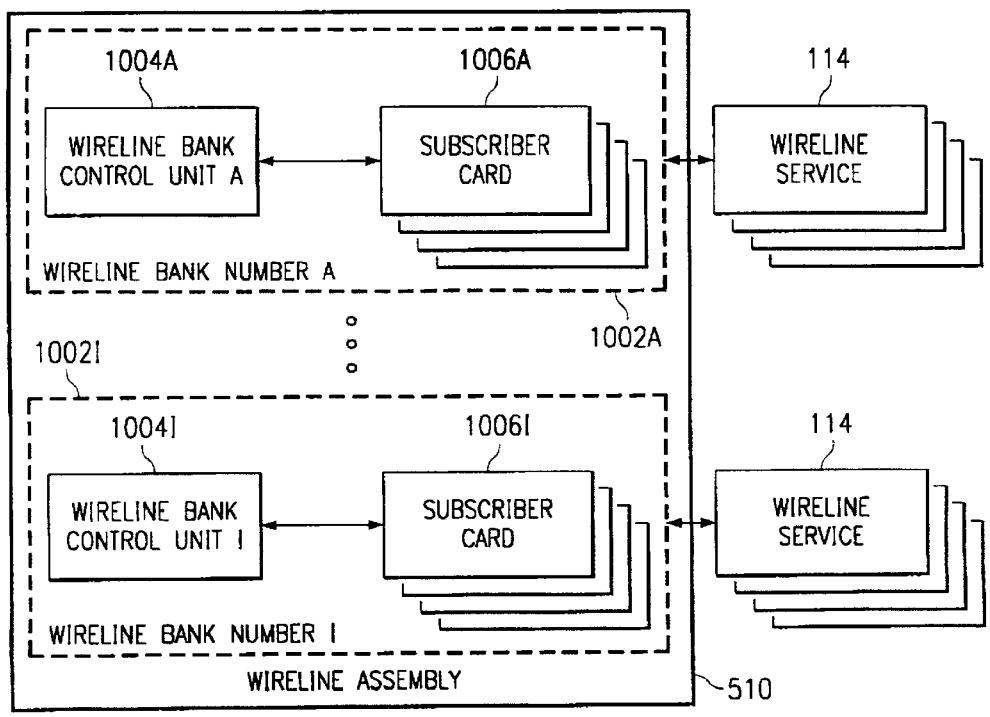
FIG. 6 is a block diagram of a wireline bank control unit in accordance with an exemplary embodiment of the present invention.

FIG. 6 is a block diagram of a wireline bank control unit 510 in accordance with an exemplary embodiment of the present invention. Wireline bank control unit 510 includes wireline bank 1002A through wireline bank 1002I. Each wireline bank further comprises a wireline bank control unit such as wireline bank control unit A 1004A through wireline bank control unit I 1004I. In addition, a plurality of subscriber cards 1006A through 1006I are coupled to each wireline bank control unit.

Each subscriber card 1006 is used to wireline service to a wireline subscriber terminal 114. For example, a wireline service may include T Carrier ally multiplexed telecommunications, such as T1, T1C, T2, T3, T4, DS1, DS2, DS3, DS4, DS5; asynchronous transfer mode communications; video communications; or other suitable wireline telecommunications services for audio, video, and/or data.

Figure 7:
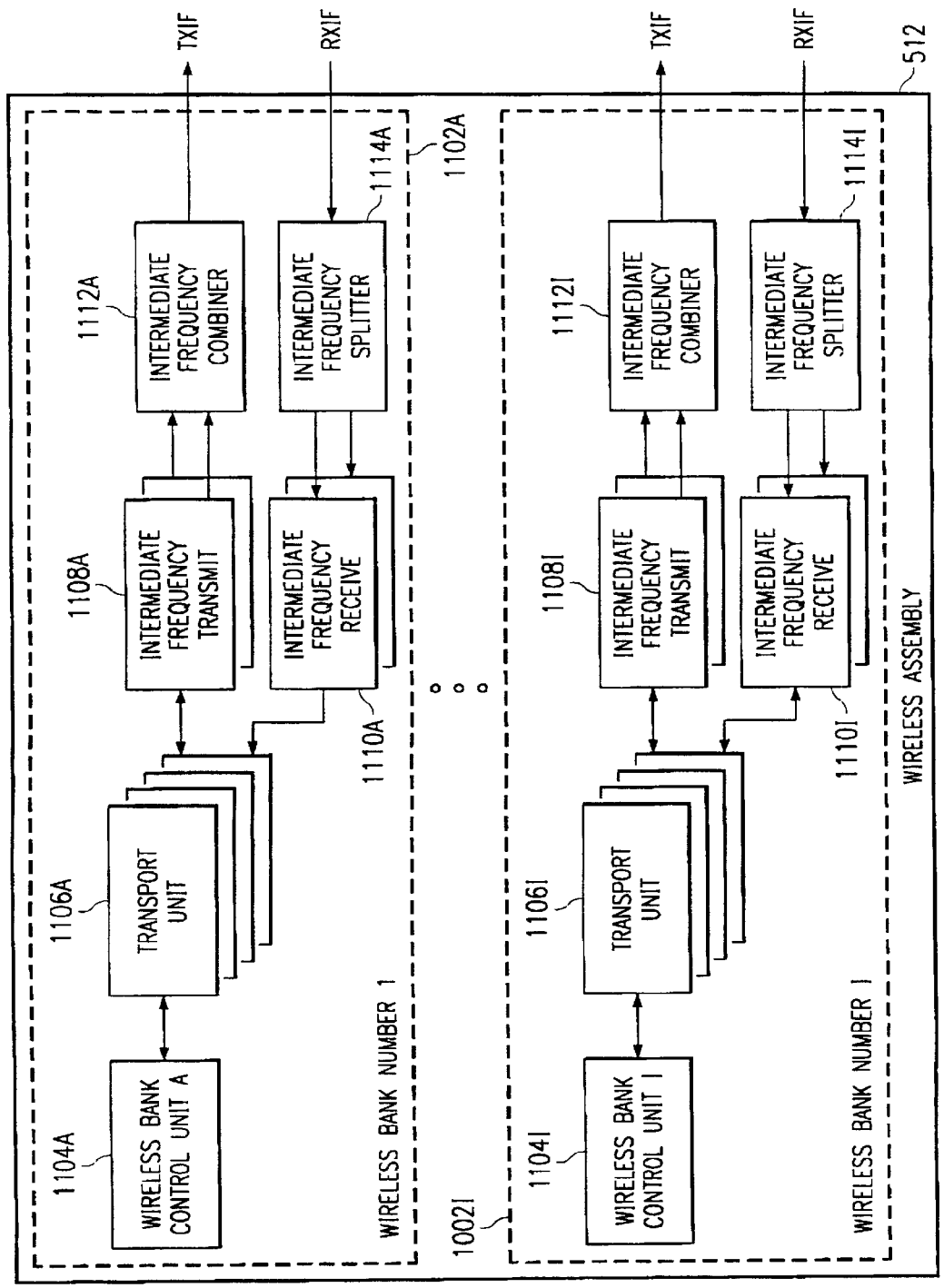
FIG. 7 is a block diagram of a wireless bank assembly in accordance with an exemplary embodiment of the present invention.

FIG. 7 is a block diagram of a wireless bank assembly 512 in accordance with an exemplary embodiment of the present invention. Wireless bank assembly 512 includes wireless banks 1102A through 1102I. Each wireless bank 1102A through 1102I further comprises a wireless bank control unit 1104A through 1104I, respectively, which is coupled to one or more transport units 1106A through 1106I, respectively. Each transport unit is a modem array that converts pulse code modulated data into a format suitable for radio transmission, and is coupled to one or more intermediate frequency transmit devices 1108A through 1108I, respectively, and intermediate frequency receive devices 1110A through 1110I, respectively. Each intermediate frequency receive device 1110A through 1110I is coupled to an intermediate frequency splitter 1114A through 1114I, respectively. Each intermediate frequency transmit device 1108A through 1108I is also coupled to an intermediate frequency combiner 1112A through 1112I, respectively.

In operation, wireless bank control unit 512 receives control data and payload data from common control and switching assembly 508 and transfers the data to transport units 1106 in response to control data. Each transport unit 1106 converts the data to a form suitable for transmission over wireless media. The converted data is then transmitted to an intermediate frequency transmit 1108 and an intermediate frequency combiner 1112 for transmission. Data received from remote wireless data terminals is transferred to an intermediate frequency splitter 1114, which is then converted by an intermediate frequency receiver 1110 and is converted into channels of data by a transport unit 1106.

Figure 8:
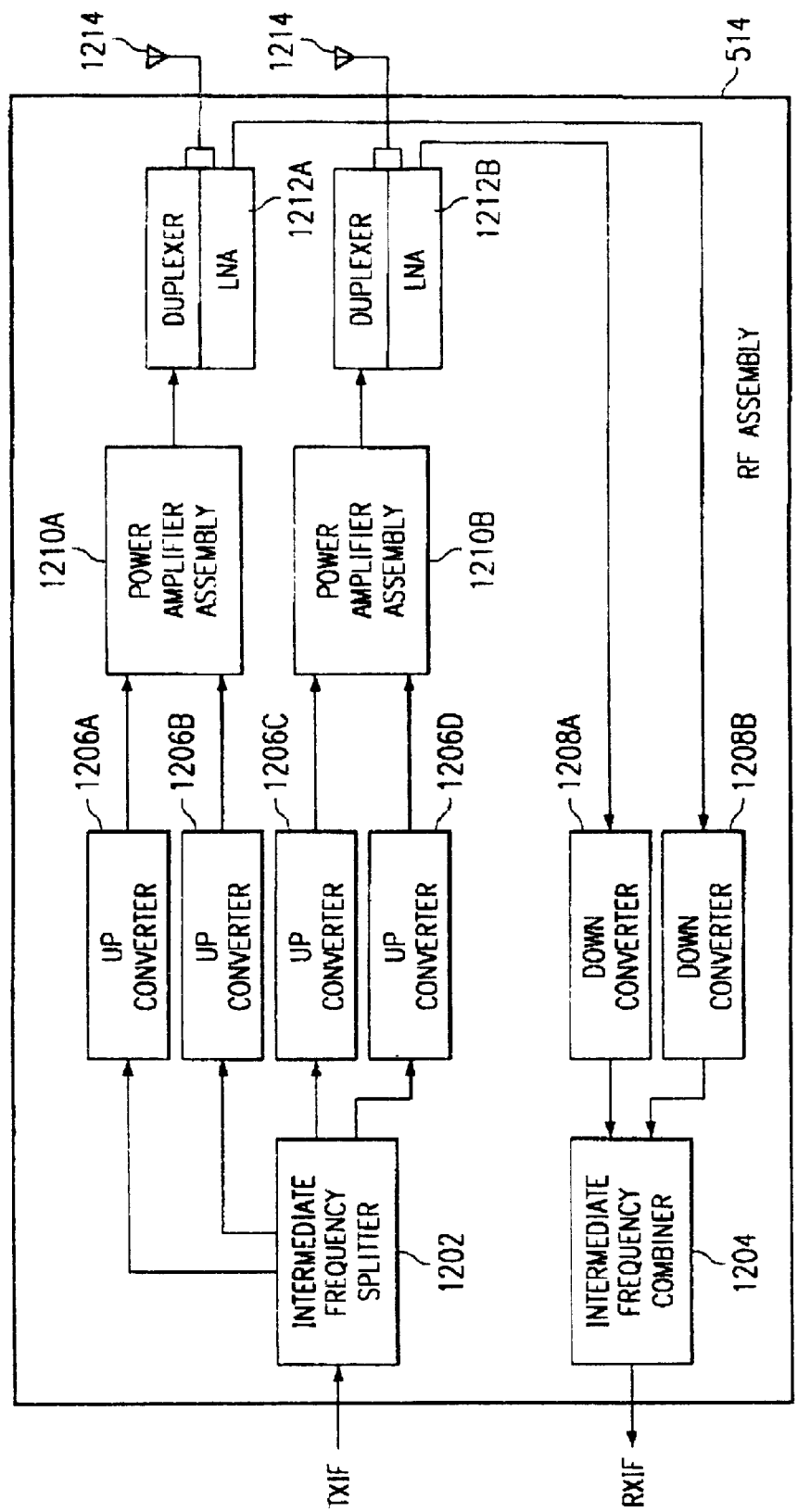
FIG. 8 is a block diagram of an RF assembly in accordance with an exemplary embodiment of the present invention.

FIG. 8 is a block diagram of an RF assembly 514 in accordance with an embodiment of the present invention. RF assembly 514 includes intermediate frequency splitter 1202, which is coupled to an intermediate frequency transmit data channel TXIF. Intermediate frequency splitter 1202 splits the intermediate frequency transmit data channel into four separate bands. Each band is then transferred to an up converter 1206A through 1206D, respectively.

Up converters 1206A and 1206B convert the frequency of the corresponding band up to a transmission frequency, and then transfer the band to power amplifier assembly 1210A. Likewise, up converters 1206C and 1206D convert the frequency of the corresponding band up to a transmission frequency, and then transfer the band to power amplifier assembly 1210B. Each power amplifier assembly 1210A and 1210B is coupled to a duplexer/low-noise amplifier 1212A and 1212B, respectively. An antenna 1214 is used to transmit the up-converted and amplified radio-frequency signals to subscriber terminals.

Signals are also received from the subscriber terminals by the antennae 1214. These signals are separated from the transmitted signals by duplexer/low-noise amplifiers 1212A and 1212B, which transfer the signals to down converters 1208A and 1208B, respectively. Down converters 1208A and 1208B shift the signals from transmission frequency to an intermediate frequency for additional processing. The shifted signals are then transferred to intermediate frequency combiner 1204 for transmission over intermediate frequency receiver data channel RXIF.

Figure 9:
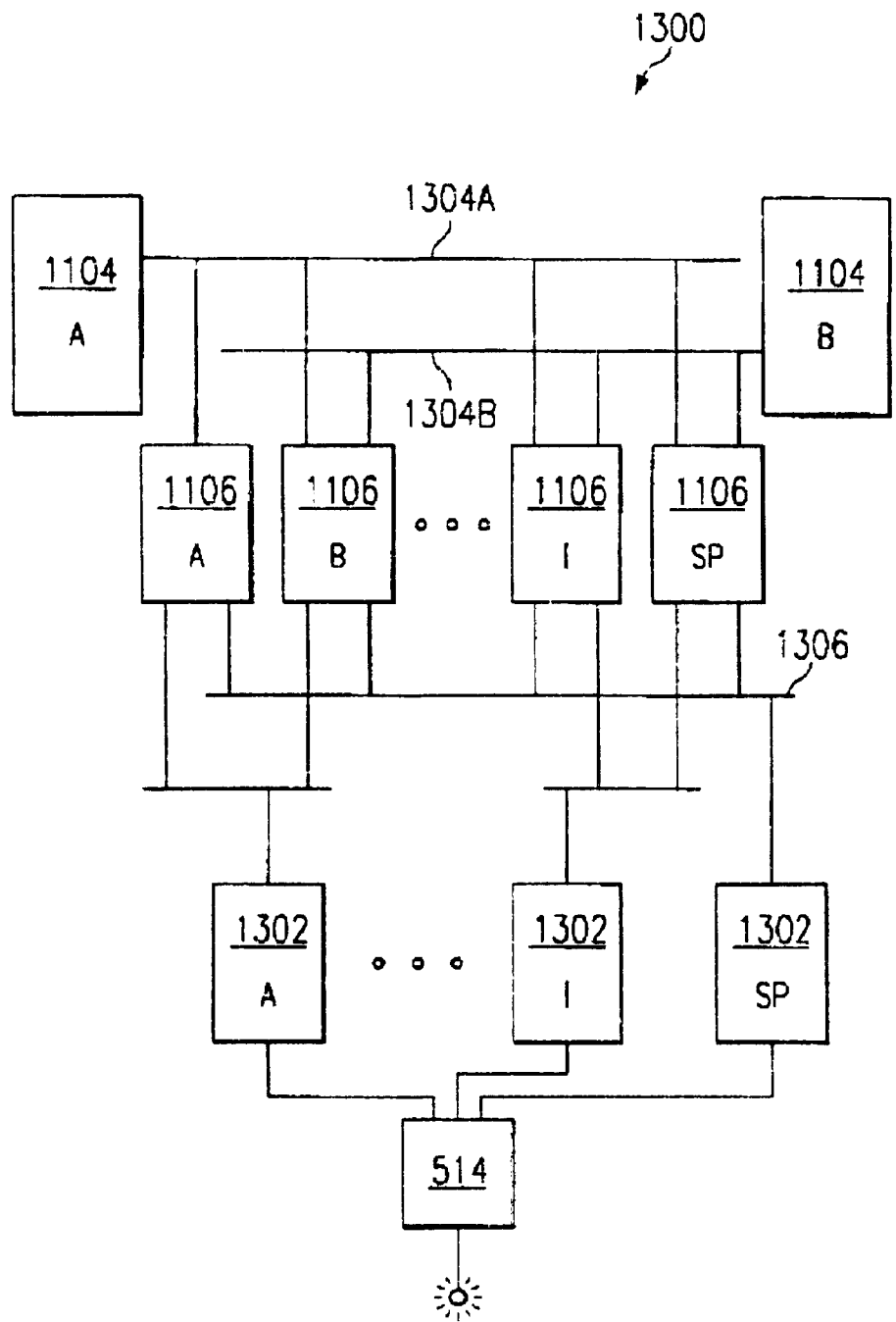
FIG. 9 is a block diagram of an exemplary redundancy system for a wireless assembly in accordance with teachings of the present invention.

FIG. 9 is a block diagram of an exemplary redundancy system 1300 for a wireless assembly in accordance with teachings of the present invention. Redundancy system 1300 is used to maintain the operability of the wireless assembly in the event of a single component failure. Redundancy system 1300 may also be used with other systems of access unit 110.

Redundancy system 1300 includes redundant wireless bank control units 1104A and 1104B, with associated control buses 1304A and 1304B, respectively. In the preferred embodiment, only one of these redundant wireless bank control units is active during normal operation. Redundancy system 1300 also includes spare transport unit 1106sp, bus interfaces 1302A through 1302I, and spare bus interface 1302SP, which provides redundancy in the event of a transport unit 1106 failure.

Alternatively, both of the control buses 1304A and 1304B may be active, such that transport units 1106A through 1106I and spare transport unit 1106SP may transmit data simultaneously on control buses 1304A and 1304B. In this alternative embodiment, bus selection is controlled by transport units 1106A through 1106I, which provides redundancy in the case of a failure of either control bus 1304A or 1304B in addition to redundancy in the case of failure of any one of transport units 1106A through 1106I. In the event of the failure of wireless bank control unit 1104A or a user-initiated swap, access unit 110 transmits control data to wireless bank control unit 1104B to become the active controller. In this embodiment, control data is transferred to each transport unit 1106, or each transport unit 1106 may independently detect a fault, select a control bus 1304N, and transmit suitable notification of these events to access unit 110.

Wireless bank control unit 1104B may receive configuration data from common control and switching assembly 508 at that time. Alternatively, wireless bank control unit 1104B may have been receiving system status data simultaneously with wireless bank control unit 1104A such that a transfer to wireless bank control unit 1104B may be accomplished without the receipt of configuration data. Wireless bank control unit 1104B then generates and transmits control data to control all restoration events that are required as the result of the loss of wireless bank control unit 1104A. Wireless bank control unit 1104B also transmits control data to all transport units 1106A through 1106I and 1106SP to transfer from bus 1304A to bus 1304B. Telecommunications processing then proceeds as normal.

In the event of a failure of any of the transport units 1106A through 1106I, the primary wireless bank control unit such as 1104A that is in control remains in control of the redundancy system 1300 and configures transport unit 1106SP to match the configuration of the failed transport unit. Wireless bank control unit 1104A also causes the subscriber bus time slots for transport unit 1106SP to match those of the failed transport unit. Bus interface 1302A generates control commands to cause the failed transport unit to be transferred to the bus interface spare bus 1306, and the spare transport unit 1106SP re-initiates communication with the subscriber terminals that were being serviced by the failed transport unit. Spare transport unit 1106SP then transmits control data to wireless bank control unit 1104A containing the modem assignments made within wireless assembly 512. Transport unit 1106SP then places telecommunications channel data traffic onto bus 1304A, and wireless bank control unit 1104A transmits control data to common control and switching assembly 508 that will be used to update data tables and data bases of common control and switching assembly 508 to reflect the change from the failed transport platform to spare transport platform 1106SP.

Redundancy system 1300 also includes a spare bus interface 1302SP. In the event of a failure of a bus interface 1302A through 1302I, the active wireless bank control unit such as 11049A controls all restoration events. The RF assembly 514 control processor detects the failure of the failed bus interface and moves the telecommunications data from the failed bus interface to spare bus interface 1302SP. The transport units 1106A through 1106I that are normally coupled to the failed bus interface are re-aligned to the spare bus interface 1302SP by control commands generated by the active wireless bank control unit. The active wireless bank control unit transmits control data to common control and switching assembly 508 that will be used to update data tables and data bases of common control and switching assembly 508 to reflect the change from the failed bus interface to spare bus interface 1302SP. Likewise, redundancy system 1300 also provides for continued operation in the event of a single failure of either of 1104A or 1104B, any single 1302A through 1302I, and any single 1106A through 1106I, in the manner described above.

Figures 10, 11:
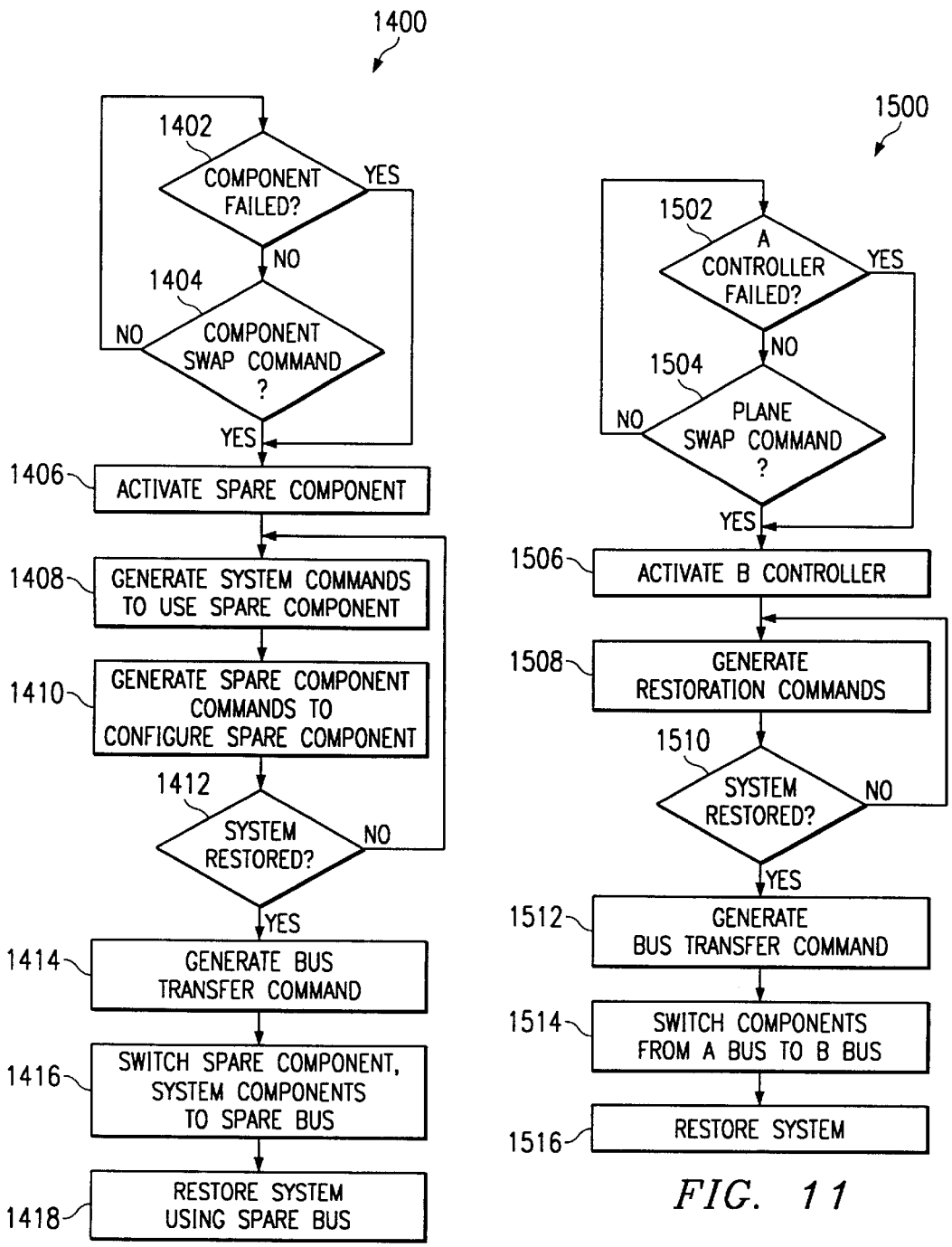
FIGS. 10, 11, 12, and 13 are flow charts of methods for providing redundancy in accordance with teachings of the present invention.

FIG. 10 is a flow chart of a method 1400 for providing redundancy in a telecommunications system in accordance with teachings of the present invention. Method 1400 may be used in a wireline system, a wireless system, an integrated wireline and wireless system such as telecommunications system 100 of FIG. 1, or in other suitable systems.

Method 1400 begins at step 1402, where the failure of a component is determined, such as by the failure to generate or respond to a periodic status message, generation of an error message, or by other suitable failure detection methods. If no failure is detected, the method proceeds to step 1404 where it is determined whether a component swap command has been received. For example, a component swap command may be used when components are removed prior to failure for routine replacement or maintenance. If a failure is detected or a component swap command has been received, the method proceeds to step 1406. Otherwise, the method returns to step 1402.

At step 1406, the spare component is activated. For example, the spare component may be a redundant controller such as wireless bank control unit 1104B, a spare transport unit 1106SP, a spare bus interface 1302SP, or other suitable spare components. Activation may be accomplished by transmitting an activation command or commands, by changing the status of the spare component from "standby" to "active" mode, or by other suitable methods. The method then proceeds to step 1408, where system commands are generated that will align the system to use the spare component, such as by a wireless bank control unit. For example, it may be necessary to transfer system components to a spare bus, to transmit the spare component data addresses to other system components, or to generate other system-level commands. The method then proceeds to step 1410, where commands for the spare component are generated, such as to receive component configuration data so that the spare component may match the configuration of the failed or swapped component. Steps 1408 and 1410 may be interchanged or performed concurrently. The method then proceeds to step 1412.

At step 1412, it is determined whether the system has been restored to an operational configuration. For example, it may be necessary to receive a response from each system component before returning the system, or the portion of the system that incorporates the spare component, to an operational state. If it is determined that the system is not restored, the method returns to steps 1408 and 1410, where system and component commands are generated to configure the system to use the spare component. Otherwise, the method proceeds to step 1414.

At step 1414, a bus transfer command is generated if a spare bus is used to couple the spare component to the system. For example, the spare bus may be used to couple a redundant wireless bank control unit to the transport units of the system. A spare bus may also be used to couple the transport units to bus interface units, or other suitable spare buses may be used. The method then proceeds to step 1416, where the spare component and relevant system components are switched to the spare bus, such as by internal alignment at each component to the spare bus from the normally assigned bus. The method then proceeds to step 1418, where the system is restored using the spare bus, such as by using the spare bus to carry telecommunications traffic, control data, or other suitable telecommunications-related data.

In operation, method 1400 may be used to provide redundancy for a telecommunications system. Method 1400 allows one or more spare components to be used to provide redundancy and improve system reliability, but does not require replication of the entire system with a spare system that is normally unused. Method 1400 preferably includes the use of a spare bus that allows the active system components and the spare component to be aligned and tested for proper configuration prior to being placed in service, thus increasing the reliability of the system with a minimal number of normally-unused component. Method 1400 may also be used in systems that do not utilize a spare bus. Although the redundancy method of FIG. 10 has been described in regards to transport units, bus interfaces, and bank controllers, it may be used with other suitable components to provide improved system reliability without requiring duplication of all or a large number of system components.

FIG. 11 is a flow chart of a method 1500 for providing redundancy in a telecommunications system in accordance with teachings of the present invention. Method 1500 may be used in a wireline system, a wireless system, in an integrated wireline and wireless system such as telecommunications system 100 of FIG. 1, or in other suitable systems.

Method 1500 begins at step 1502, where the failure of the bank control unit, such as the A train wireless bank control unit 1104A, is determined, such as by the failure to generate or respond to a periodic status message, generation of an error message, or by other suitable failure detection methods. If no failure is detected, the method proceeds to step 1504 where it is determined whether a bank control unit swap command has been received. For example, a bank control unit swap command may be used if the bank control unit is being removed prior to failure for routine replacement or maintenance. If a failure is detected or a bank control unit swap command has been received, the method proceeds to step 1506. Otherwise, the method returns to step 1502.

At step 1506, the redundant bank control unit is activated, such as B train wireless bank control unit 1104B. The method then proceeds to step 1508, where system restoration commands are generated that will align the system to recognize the redundant bank control unit. For example, system components may be aligned to the A train bank control unit, and may not accept commands from the B train bank control unit until a predetermined period of time elapses since the system component has received a command from the A train bank control unit. In addition, it may be necessary to transfer configuration data from the A train wireless bank control unit to the B train wireless bank control unit. This transfer of configuration data can be done on an on-going basis between the primary and secondary bank control units, so as to minimize the amount of data that must be transferred or that will be otherwise lost when the primary bank control unit fails. Other suitable methods may also be used. The method then proceeds to step 1510, where it is determined whether the system has been restored to an operational configuration. For example, it may be necessary to receive a response from each system component at the B train bank control unit before the B train bank control unit generates commands that cause the system to return to operability.

If it is determined at step 1510 that the system has not been restored to an operable configuration, the method returns to step 1508 where the restoration command generation continues. For example, if a predetermined length of time has occurred since the activation of the redundant controller and the system has failed to become restored, then a complete restart of the system may be performed. Otherwise, the method proceeds to step 1512.

At step 1512, a bus transfer command is generated to transfer system components such as transport units 1106A through 1106I to a bus associated with the redundant bank control unit. The method then proceeds to step 1514, where the system components switch to the redundant bank control unit bus. If the system components are directly coupled to each bus, this may be accomplished by directing the transmission of data to the redundant bus instead of the primary bus. The method then proceeds to step 1516, where the system is restored and telecommunications data is transmitted to subscriber units.

In operation, method 1500 may be used to provide redundancy for a telecommunications system that utilizes a primary and spare controller such as a bank control unit. Method 1500 allows one or more spare components to be used to provide redundancy and improve system reliability, but does not require replication of the entire system with a spare system that is normally unused. Method 1500 preferably includes the use of a spare bus that is coupled to all active system components that are controlled by the controller, thus allowing the components to be controlled by simply switching control buses. Although the redundancy method of FIG. 11 has been described in regards to transport units, bus interfaces, and bank controllers, it may be used with other suitable components to provide improved system reliability without requiring duplication of all or a large number of system components.

Figure 12:
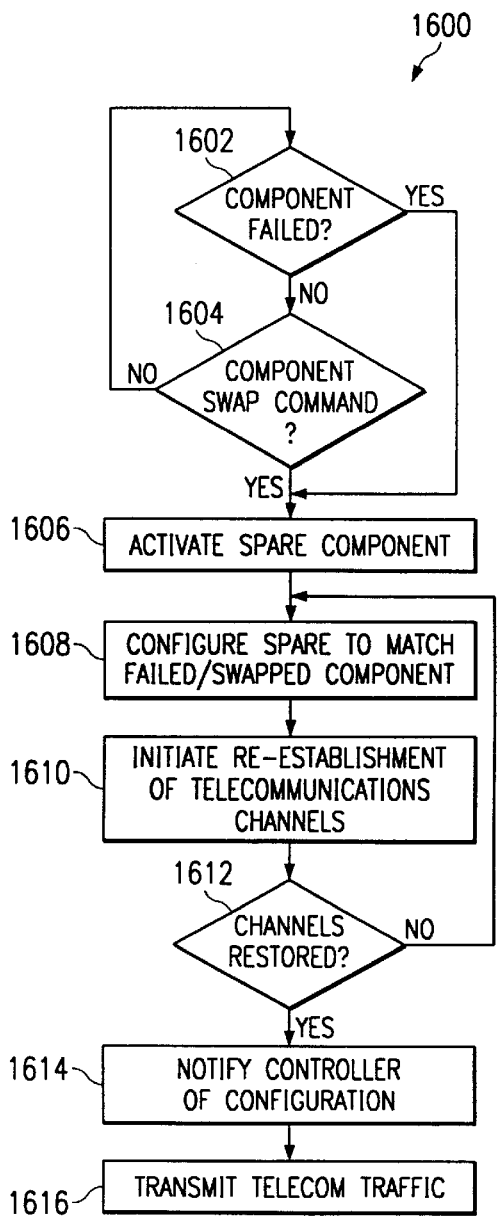

FIG. 12 is a flow chart of a method 1600 for providing redundancy in a telecommunications system in accordance with teachings of the present invention. Method 1600 may be used to interface a spare transport unit such as 1106SP to an active bank control unit and an active bus interface, without resulting in the interruption of service provided by other transport units.

Method 1600 begins at step 1602, where the failure of a transport unit is determined, such as by the failure to generate or respond to a periodic status message, generation of an error message, or by other suitable failure detection methods. If no failure is detected, the method proceeds to step 1604 where it is determined whether a transport unit swap command has been received. For example, a transport unit swap command may be used when a transport unit is being removed prior to failure for routine replacement or maintenance. If a failure is detected or a transport unit swap command has been received, the method proceeds to step 1606. Otherwise, the method returns to step 1602.

At step 1606, the spare transport unit is activated. The method then proceeds to step 1608, where the spare transport unit is configured to match the transport unit that is being replaced. For example, the spare transport unit may receive timeslot assignments and component addresses that were previously assigned to the transport unit that is being replaced. The method then proceeds to step 1610, where telecommunications channels to the subscriber units are re-established. For example, it may be necessary to transmit signaling and control data to the subscriber units that were being service by the replaced transport unit so that those subscriber units may exit a standby mode, re-align to a new radio-frequency channel, or perform other suitable processes that will allow the subscriber units to receive telecommunications data from the spare transport unit. The method then proceeds to step 1612.

At step 1612, it is determined whether the channels have been restored to the subscriber units. For example, it may be necessary to receive a response from each subscriber unit before placing the spare transport unit into service. If it is determined that the channels are not restored, the method returns to steps 1608 and 1610, where configuration of the spare transport unit and re-establishment of telecommunications channels continues. Otherwise, the method proceeds to step 1614.

At step 1614, data is transmitted to the active bank control unit to signify that the telecommunications channels to the subscriber units have been restored. The bank control unit then allows telecommunications traffic to be transmitted between the spare transport unit and the subscriber units.

In operation, method 1600 may be used to provide redundancy for a telecommunications system. Method 1600 allows one or more spare transport units to be used to provide redundancy and improve system reliability, but does not require replication of the entire system with a spare transport unit for each active transport unit. Although the redundancy method of FIG. 12 has been described in regards to transport units, bus interfaces, and bank controllers, it may be used with other suitable components to provide improved system reliability without requiring duplication of all or a large number of system components.

Figure 13:
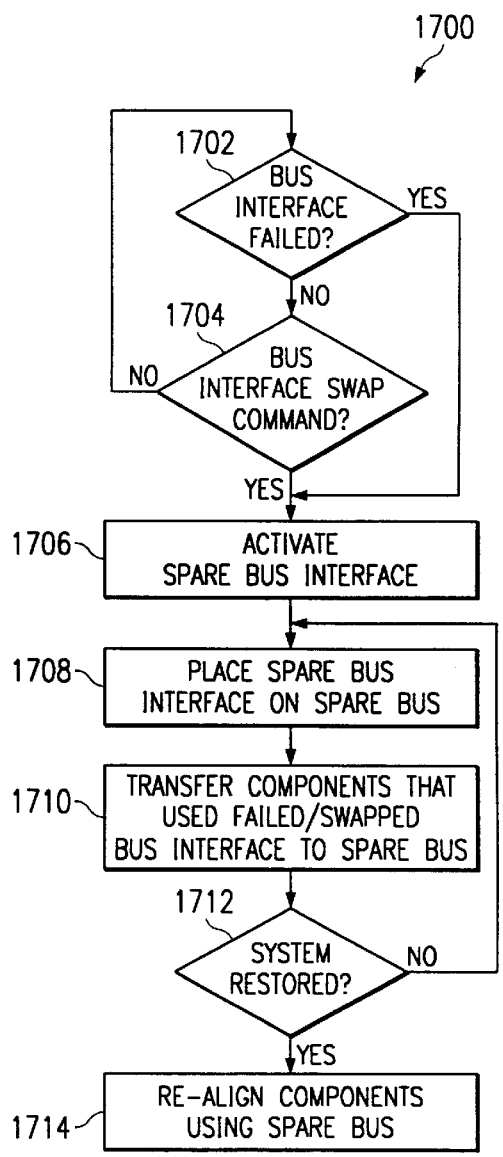

FIG. 13 is a flow chart of a method 1700 for providing redundancy in a telecommunications system in accordance with teachings of the present invention. Method 1700 may be used to interface a spare bus interface such as 1402SP to active transport units without resulting in the interruption of service provided by other transport units.

Method 1700 begins at step 1702, where the failure of a bus interface is determined, such as by the failure to generate or respond to a periodic status message, generation of an error message, or by other suitable failure detection methods. If no failure is detected, the method proceeds to step 1704 where it is determined whether a bus interface swap command has been received. For example, a bus interface swap command may be used when a bus interface is being removed prior to failure for routine replacement or maintenance. If a failure is detected or a bus interface swap command has been received, the method proceeds to step 1706. Otherwise, the method returns to step 1702.

At step 1706, the spare bus interface is activated, such as by transmitting configuration data from the failed/swapped-out bus interface to the spare bus interface. The method then proceeds to step 1708, where the spare bus interface is placed on the spare bus. In this manner, the transport units that are coupled to the bus interface that is being swapped or that has failed can be easily re-aligned to the spare bus interface. This flexible method allows any of the bus interfaces to be replaced by the spare bus interface. The method then proceeds to step 1710, where the components that used the failed or swapped-out bus interface are transferred to the spare bus interface. For example, it may be necessary to transmit control data to the transport units that will cause them to transmit telecommunications data to the spare bus interface, such as data addresses and bus time slots. The order of steps 1708 and 1710 may be interchanged, or they may be performed simultaneously. The method then proceeds to step 1712.

At step 1712, it is determined whether the spare bus interface has been aligned such that the portion of the system that utilizes the spare bus interface may be restored. For example, it may be necessary to receive a response from the spare bus interface that indicates that all of the transport units that were flagged as being serviced by the failed/swapped-out bus interface have been aligned with the spare bus interface. If it is determined at step 1712 that the system may not be restored, the method returns to steps 1708 and/or 1710. Otherwise, the method proceeds to step 1714 where the transport units are realigned with the spare bus interface using the spare bus, and the system is returned to full service.

In operation, method 1700 may be used to provide redundancy for a telecommunications system. Method 1700 allows one or more spare bus interfaces to be used to provide redundancy and improve system reliability, but does not require replication of the entire system with a spare bus interface unit for each active bus interface. Although the redundancy method of FIG. 13 has been described in regards to transport units, bus interfaces, and bank controllers, it may be used with other suitable components to provide improved system reliability without requiring duplication of all or a large number of system components.

While an embodiment of the present invention has been described in detail, the present invention includes embodiments different from those described, yet within the scope of the claims. For example, the terms "controller," "processing circuitry," and "control circuitry" may include application specific integrated circuits, field programmable gate arrays, programmable array logic, programmable logic arrays, decoders, memories, non-software based processors, or other circuitry, digital computers including microprocessors and microcomputers of any architecture, or other suitable devices or systems. Memory devices may include static random access memory, dynamic random access memory, electrically-erasable programmable read-only memory, erasable programmable read-only memory, registers, or other suitable memory devices.

Aspects of the claimed invention may be applied to switching systems for GSM mobile switches, PCS mobile switches, switches primarily used for switching land-based circuits, or other suitable switches. The telecommunications circuits described in the preferred embodiment were generally E1 or T1 spans, but aspects of the invention could be applied to platforms that switch lower- or higher-bandwidth circuits such as T2 circuits, T3 circuits, or Synchronous Optical Network circuits. Also, aspects of the invention could be applied to switch circuits of bandwidths generally equivalent to E1 or T1 but having different framing formats.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A redundancy system for a telecommunications system comprising:

one or more resources;

a controller coupled to the resources via a controller bus;

another controller coupled to the resources via another controller bus; and wherein the one or more resources are each coupled to the controller bus and the other controller bus, such that a change in control between the controller and the other controller may be accomplished by transmitting control data to the one or more resources to transfer from the controller bus to the other controller bus; and wherein configuration data for the controller is also transmitted to the other controller such that the controller and the other controller can both obtain active control of the telecommunications system; and wherein the one or more resources further comprise:
   a plurality of active transport units that are operable to establish and maintain telecommunications channels;
   at least one spare transport unit; and
   wherein the spare transport unit is operable to receive configuration data from any of the transport units so as to assume the operations of any of the transport units in the event of failure of one of the transport units.

2. The redundancy system of claim 1 wherein the one or more resources further comprise:
   a plurality of active bus interfaces that are operable to transfer modulated telecommunications data to an RF assembly;
   at least one spare bus interface; and
   wherein the spare bus interface is operable to receive configuration data from any of the bus interfaces so as to assume the operations of any of the bus interfaces in the event of failure of one of the bus interfaces.

* * * * *